United States Patent [19]

Wakayama et al.

[11] Patent Number: 4,909,722

[45] Date of Patent: Mar. 20, 1990

[54] APPARATUS FOR PTP POCKET FORMATION

[75] Inventors: Yoshikane Wakayama; Yoshinobu Fukuda; Masao Shibagaki, all of Osaka, Japan

[73] Assignee: Shionogi & Co., Ltd., Osaka, Japan

[21] Appl. No.: 209,071

[22] Filed: Jun. 20, 1988

[30] Foreign Application Priority Data

Jun. 23, 1987 [JP] Japan ............................. 62-157242
Jul. 15, 1987 [JP] Japan ........................... 62-109237[U]

[51] Int. Cl.⁴ ............................................. B29C 51/20
[52] U.S. Cl. .................................. 425/384; 264/322; 264/522; 425/398; 425/407; 425/416; 425/423
[58] Field of Search ............... 425/335, 344, 346, 383, 425/384, 397, 398, 407, 416, 423; 264/292, 322, 522

[56] References Cited

U.S. PATENT DOCUMENTS

| | | | |
|---|---|---|---|
| 1,942,251 | 1/1934 | Mains | 425/384 X |
| 2,521,847 | 9/1950 | Harr | 425/407 X |
| 3,256,564 | 6/1966 | Welshon | 264/522 X |
| 3,570,064 | 3/1971 | De Groot | 425/384 X |
| 3,642,411 | 2/1972 | Desnick et al. | 264/322 X |
| 4,048,781 | 9/1977 | Johansen | 264/322 X |
| 4,666,394 | 5/1987 | Wakamiya et al. | 425/384 X |

FOREIGN PATENT DOCUMENTS 2161272  6/1973  Fed. Rep. of Germany ...... 425/384

OTHER PUBLICATIONS

Publication entitled "Blister-Pack, FBP-M2" by CKD Corporation, May, 1985.

Primary Examiner—Richard L. Chiesa
Attorney, Agent, or Firm—Birch, Stewart, Kolasch & Birch

[57] ABSTRACT

A present invention is directed to an apparatus for PTP Pocket forming on a sheet which requires delicate care for handling. Combination of local and discriminate preparative heating of the pocket-regions of freshly unrolled sheets while leaving the rest of the sheet in a cooled state in a lattice structure, preliminarily expanding said regions up to about 70% of the volume of the recesses of the female die by pressing heated plugs to the region and supplying compressed-air to the expanded region. Details of the temperature control on various steps parts of the apparatus as well as a means for attaining virtually complete thermal equilibrium over the preparative heating station are also disclosed.

3 Claims, 4 Drawing Sheets

APPARATUS FOR PTP POCKET FORMATION

BACKGROUNDS AND RELATED PRIOR ART STATEMENT

1. Field of the Invention

The present invention relates to a pocket-forming step and a related preparative step in PTP (Press-through-packaging) machines. In particular, it is concerned with a method and an apparatus for forming pockets on a newly-developed unrolled PTP sheet which has high moisture-resistant but requires delicate care in handling, particularly in molding operations performed in order to form pockets which accommodate articles to be wrapped individually.

2. Description of the Prior Art

In the early promoting stage, polyvinyl chlorides (PVC) were mainly used as unrolled sheets for PTP and are still occupying the predominant position even at present. The predominance can be attributable to the very easy molding property of PVC resulting from an extremely broad range of molding temperatures i.e., 82°–212° C. and the permitted coarse temperature adjustment of heating means, say, ±10° C. in generally-accepted compressed-air blowing methods. And a simple heating means such as passage through a radiation tunnel may be used in the preparative heating without any trouble.

In the case of a monolayer PVC sheet, widely adopted compressed-air blowing may be employed for forming pockets in a manner wherein the evenly heated unrolled sheet is extended over a metal female die and compressed-air is blown to pocket regions of the sheet to inflate the specified regions until the outer surface of the regions comes in smooth and intimate contact with the inner surface of the female die.

Such an excellent molding property of PVC may also be attributable to its amorphous property and the method of the stated level, which can dispense with the use of any solid male die or plug, can be employed without any trouble.

However, the moisture-resistant property of PVC is insufficient when the level of the required property is set very high in such case wherein the articles to be packaged are, for instance, medicines. An additional gas-tight wrapping is required but it does not however guarantee the quality of the articles once the wrapping has been loosened.

On account of this difficulty, attempts have heretofore been made, one after another, for adopting a monolayer sheet of polyethylene (PE) or polypropylene (PP), or various laminated sheets. The moldings of these sheets are however by no means easy because the temperature ranges permitted for the molding operation narrows gradually as the material varies, for instance; from 125° C. to 155° C. for a PP monolayer sheet and from 124° C. to 135° C. for a multiple laminated sheet having at least one core layer of high density PE.

When the object to be molded is PP, which is a crystalline high molecular substance, it is difficult to follow such a method because PP has a narrower temperature range for molding and poor molding properties. That is, evenly heating the sheet may cause troubles during transfering because the even heating sometimes means excessive softening which may invite "draw-down" of the sheet along the transfering path. On the other hand, if the sheet as a whole is heated only to an extent of effectively avoiding the transferring troubles, it may cause insufficient softening which sometimes results in an unacceptable uneven thickness of the deeply drawn pockets.

Namely, a conventional preparative heating by passing the sheet through a radiation tunnel is insufficient for performing stable transferring and high speed molding of such PP sheet, not to mention difficulty in temperature controlling.

As a result of the previously described reasonings, the method has gradually been replaced by a method wherein the unrolled sheet is repeatedly sandwiched between a pair of reciprocating solid plates to be conductively heated. The heat transfer by conduction has an auxiliary advantage in that it is easy to heat only pocket-forming regions locally and discriminately to leave the rest intact as a lattice. Therefore, the sheet after being heated has a "lattice" structure which can withstand the tension developed in the direction of the sheet's travel.

The standard mode of preparative heating by conduction is sandwiching the sheet supplied by intermittent transfering between a pair of heating plates and repeating the heating until the core temperature of the sheet reaches a saturation temperature, i.e. that equals the temperature of the heating plates. It is particularly important in handling materials of narrow temperature range, wherein molding is permitted, such as PE monolayer sheet and a multiple laminated sheet having at least one core layer of high density PE. Therefore, the length of heating plates and number of repetitions (tact), when that of the molding step is set to a standard (one tact), inevitably become greater and the requirement for the uniform temperature of the plates becomes correspondingly stricter.

Attempts have been made for the required uniform heating and for equalizing temperature of the large heating plate by adjusting the distribution of electric power consumed is embedded heaters or by adopting a means of embedding a heat pipe or pipes in place of the electric heaters. An abnormal localized rise in temperature at, for instance, places remote from the supporting means which hold the heating plates on a vertical mainframe of the machine could not still however be avoided and it was difficult to satisfy the functional requirement of fine temperature adjustment, say ±1.5° C., over the entire heating plates.

OBJECTS AND BRIEF SUMMARY OF THE INVENTION

It is a primary object of the present invention to provide a system for forming pockets on a freshly unrolled PTP sheet, i.e., a method and an apparatus which satisfy the previously-described functional requirements.

It is another object of the present invention to provide a method and apparatus for handling the sheet which requires delicate care whereby the previously-described drawbacks of the conventional system are effectively obviated.

These and other objects and attendant advantages thereof will be apparent to those skilled in the art by reading the following disclosure made by referring to the appended drawings.

In the pocket forming step, plugs heated up to about the softening temperature of the unrolled sheet are pressed on pocket (forming) regions of the unrolled sheet which have been heated locally and discriminately in the prior step but whose non-pocket (forming)

regions are in their cooled state by being sandwiched between a metal female die and a corresponding top-plate of a plug-guide to preliminarily expand the pocket regions of the sheet up to about 70% volume of the recesses of said female die. Compressed-air is then blown in to the expanded region through a clearance formed between the plugs and the plug-guide.

The unrolled sheet being the object to be dealt with by the present method is a multiple laminated sheet having at least one core layer of high density PE (compound polymer sheet, disclosed in Published European Patent Application, EPA. No. 0 245 034). The disclosed method can also be employed for molding polyoleffine monolayer sheets as well as other multiple laminated sheets as its fundamental construction. In performing the method, the temperatures of the respective components and the times required for the respective steps could of course be changed to accommodate this new object. In the case of a laminated sheet including PE, the adjustments require remarkably high accuracy.

According to the present invention, there is provided a method of PTP pockets formation on a multiple laminated sheet including at least one core layer of high density polyethylene, comprising the following successive steps;

(a) heating pocket regions of a freshly unrolled sheet locally and discriminatively until their core temperatures reach 124°–132° C., (b) sandwiching said fresh sheet between a metal female die and a corresponding top-plate of a plug-guide to cool down non-pocket regions of the sheet below 30° C., (c) pressing plugs heated at 100°–120° C. onto the pocket regions of the sheet under the sandwiching state to preliminarily expand the regions up to about 70% of the volume of the recesses of the female die, (d) blowing compressed-air in to the expanded regions through a clearance formed between the plugs and the plug-guide to inflate the expanded region until the outer surface thereof comes in smooth contact with the inner surface of the female die, and (e) separating said metal female die, plugs and plug-guide from the sheet.

If the described local and discriminative heating is short of making the specified regions 124° C., it may lead to an uneven thickness of the pocket and if it is in excess of 132° C., the unrolled sheet may hang down along the transferring path and result in a transferring trouble. In the case of the present method, it has been found that it is most preferable to adjust the temperature to about 127° C. This is in sharp contrast with the case of PP wherein the temperature range is as broad as 124° C.–135° C., and easy control is permitted.

The disclosed metal female die and the corresponding top-plate of the plug-guide may preferably be capable of cooling the non-pocket regions of the freshly unrolled sheet down to 24° C., as well as maintaining this temperature. This is important for minimizing the thermal shrinkage of the non-pocket regions and for keeping good dimensional stability of the press-through packaging sheet as a whole. The dimensional stability is necessary for the subsequent stable transfering of the sheet, reliable filling operation, and the like. For this reason, a particularly efficient method for cooling is adopted.

In the disclosed method, if the temperature of the plugs is under 100° C., it may invite an excessive temperature drop in the pocket regions of the unrolled sheet which results in the uneven wall thickness of the formed pocket, ill-shaped pocket or whitening (devitrification) of the top of the pocket.

Meanwhile, if the temperature of the plugs exceeds 120° C., the heating may lead to a partial flowing-out of the core PE layer. It has been found that a plug-temperature of about 110° C. is found to be the most preferred. The PP monolayer sheet permits easy control of the plug temperature ranging up to 150° C. because there is no problems of the partial flowing out of the core PE layer.

Furthermore, the local and discriminative heating of said pocket-forming-regions should preferably be performed by sandwiching the fresh unrolled sheet between a pair of heating plates which have confronting convexed plateaux corresponding to the pocket-forming-regions and by transferring heat on the specified regions to raise the core of the unrolled sheet to the saturation temperature through conduction.

More concretely, in raising the core temperature of the unrolled sheet equal to the temperature of said pair of the heating plates (saturation temperature), preferably to about 127° C., it is necessary to assign a time which is sufficient for the step.

The time is an inevitable interruption of the travel and is usually more than the time taken for the molding step. For instance, in the case of an average transferring speed of 2.9 m/minute (100 standard pockets per minute), it is necessary to assign a time which corresponds to more than 3 tacts in this discriminate heating if the molding operation takes 1 tact of the intermittent transferring. The number of the tacts required for the preparative heating will increase with the increasing transferring speeds. In contrast to this, a time of just 2 tacts is sufficient for PP, because it has a broad temperature range.

According to another aspect of the present invention, there is also provided, in an apparatus for PTP pockets formation, the apparatus which comprises a combination of the following means being supported in cantilever fashion on a vertical mainframe of the PTP machine;

(a) a pair of heating plates positioned on a first station, having regularly arranged plateaux corresponding to the PTP pockets, confronting with each other, both plates being capable of sandwiching the sheet in between and of conductively heating the sheet to raise the core-temperature of the sheet up to the plates temperature, and at least one plate of which is capable of moving reciprocatively in the direction perpendicular to the transferring path in synchronism with the intermittent travel of the sheet, (b) a metal solid female die positioned on a second station, having a plurality of recesses corresponding to the PTP pockets and paths for cooling medium arranged closely to the recesses, and being capable of moving reciprocatively in the direction perpendicular to the transferring path in synchronism with the intermittent travel of the sheet, (c) a plug-guide positioned on said second station, having a top plate which contains a plurality of holes each of which accommodates each of plugs which corresponds to each of said recesses but makes the plugs movement free, having paths for cooling medium arranged closely to the holes, and being capable of sandwiching said fresh sheet between said solid female die, (d) a plug-base integrally holding said plugs of the number corresponding to the hole numbers of said top plate, having a controllable heating means, and being capable of moving reciprocatively in the direction perpendicular to the transfering path in synchronism with the movement of said metal solid female die; each of said plugs can press said sandwiched sheet at each of the corresponding pocket regions to preliminarily expand the regions to about 70% of the volume of the recesses of said metal solid female die, and (e) a means for blowing compressed-air into said preliminarily expanded pocket regions of the PTP sheet through the clearance formed between said plugs and plug-guide.

As already disclosed with respect to the method, said pair of heating plates of Item (a) above should preferably be capable of raising the core temperature of the unrolled sheet up to a temperature which equals the heating plates (saturation temperature) i.e., about 127° C., rapidly, and need to have a length corresponding to the three tacts of the intermittent transferring (when the molding operation may be completed in one tact) for enabling the whole machine to achieve a sufficiently high molding speed. This is in sharp contrast with the case of the molding of PP, wherein the travel for only two tact lengths can do the same job, because it has a broad range of moldable temperature and does not necessarily need to be brought to its saturation temperature.

Furthermore, said metal solid female die defined in Item (b) and the top plate of the plug-guide defined in Item (c) are designed to be combined to make a pair and to have paths for coolant for the effective cooling of the non-pocket regions of the unrolled sheet for PTP; the paths in the female die must be very close to the recesses and those in the top plate of the plug-guide must be near the through holes for accommodating the plugs. In the case of PP, such a contrivance is not required and the paths for coolant are usually placed remote from those recesses or through holes for the convenience of machining. The necessity of the close arrangement of the paths for the coolant was first found by the inventors in dealing with such new objects as the multiple layer laminated sheet.

The controllable heating means included in the plugs defined in Item (d) serve to prevent the cooling of the once purposely heated regions of the sheet by contact. The pressure exerted by the plug preliminarily forms the PTP pockets of the unrolled sheet up to about 70% of the volume of the recesses of the female dies. The compressed-air blown in accordance with Item (e) finishes the pockets so that the outer surfaces of the sheet contact the inner surfaces of the recesses of the female dies.

Equalization of the thermal distribution throughout the heating plates for preparative heating requiring virtually no adjustment has been effectively achieved by providing a forced air-cooling means on at least parts of said heating plates. By so doing, virtually no subsequent adjustment on the air to be circulated in the means is required once the pressure on the air is set for the intended object. The supply may however be controlled on the basis of the temperature signal derived from a temperature sensor provided on said heating plates.

Said forced air-cooling means may preferably be solid blocks of heat conducting material being installed closely and integrally on the outer surfaces of said pair of the heating plates at parts remote from the cantilever support means. In the solid blocks, there are provided meanderingly arranged tubular paths for communicating air.

These solid blocks may successfully be replaced by a combination of a multiplicity of cooling fins provided on the outer surfaces of the heating plates and of airtight (hermetically) sealed shrouds covering said fins.

It is of course necessary to circulate air through these means and this object may preferably be attained by an additional provision of a controllable air supplying means.

By embodying this aspect to the PTP machine, the temperature of the heating plates can successfully be controlled to a narrow range of say, ±1.5° c., only by installing an apparatus for extremely simple structure with easiness of operation and maintenance. This means an enablement of stable transfering and an easy molding of such a material having a vary narrow temperature range permitted for molding as a PE monolayer sheet or a multiple laminated sheet having at least one core layer of high density PE. It is needless to say that it may also be used for the preparative heating of a PP monolayer sheet.

DESCRIPTION OF THE PREFERRED EMBODIMENTS

By embodying the present invention structured as previously described, an effective molding of PTP pockets on a multiple laminated sheet including at least one core layer of high density polyethylene can be achieved.

EXAMPLE 1

Pocket-Forming

Figure 1:
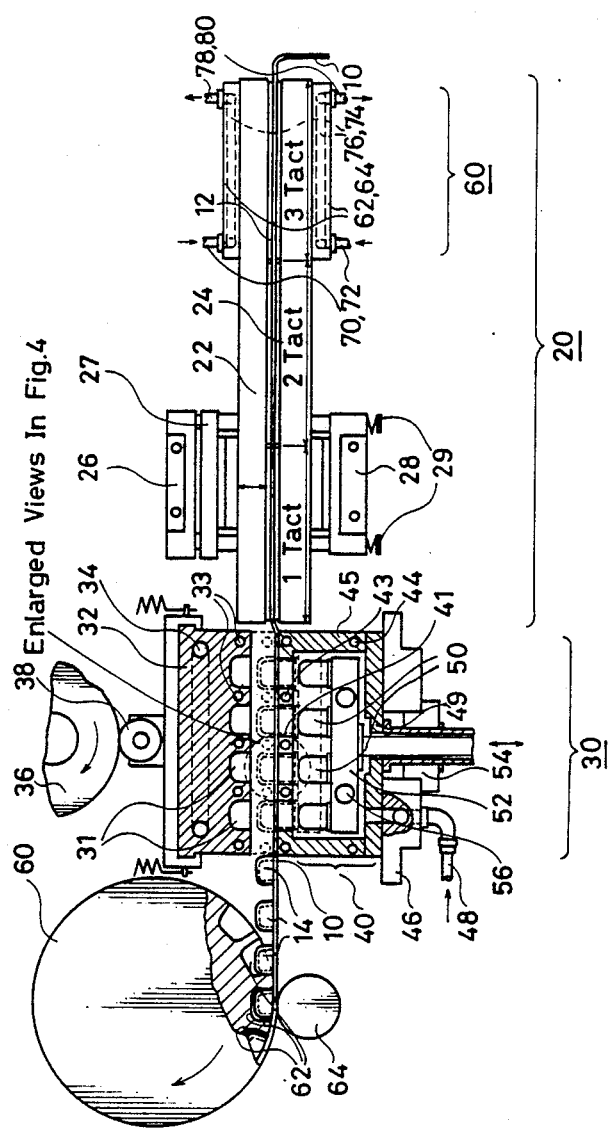
FIG. 1 is a side elevation of an example of the apparatus built in accordance with the present invention with parts thereof cut-out for the comprehensive illustration.

In the drawings, FIG. 1 is a side elevation of an apparatus for embodying the method of the present invention, whose essential parts cut out for comprehensive illustration.

Figure 2:
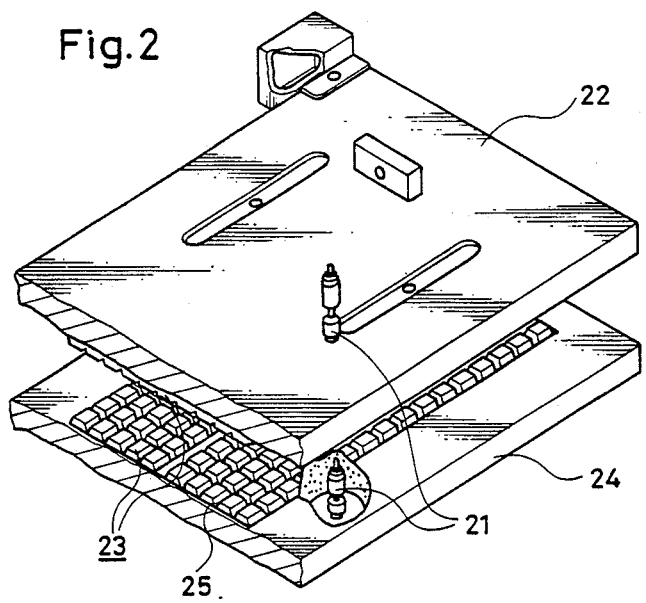
FIG. 2 is a fragmental perspective view of the simple heating plates for the preparative heating.

As specifically shown in FIG. 2, a pair of heating plates 22/24 made of good heat conducting material, usually, of a metal, are supported on a vertical mainframe of a consolidated PTP machine (in a plane which corresponds to the paper of FIG. 1) directly or indirectly by brackets 26/28, for instance, in a shown cantilever fashion, in the preparative heating station 20.

In the drawing, 60 indicates a zone reserved for forced air-cooling which may optionally be installed and will be discussed in detail in connection with Example 2, later. 70 and 72 indicate inlet pipes which communicate to an unshown air supplying means therefor. Each of the plates contains an electric heater and a temperature sensor 21 in it but details of which are omitted from the illustration.

Of these plates, the lower heating plate 24 is installed fixedly but the upper heating plate 22 is capable of moving reciprocally and vertically as indicated by an arrow in synchronism with said intermittent transferring of the sheet and of repeatedly sandwiching the unrolled sheet 10 between the lower plate 24 to exert pressure on the pocket (forming) region of the sheet 10, by a driving means 27 mounted on the bracket 26 and a related shock-absorbing spring 29.

On confronting surfaces of both heating plates 22/24, provided a multiplicity of the heating plateaux 23 projected in relief by being divided by grooves 25 (omitted from FIG. 1) to form a lattice structure.

In the molding station 30, a metal solid die 32 has recesses 31 and paths 33 for cooling medium arranged close to the recesses 31. The inner configuration of the recesses 31 corresponds with the outer configuration of the pockets 14 to be formed. The number of the recesses 31 in a unit is equal to that of the pocket 14 which should be formed for one tact. The die 32 is designed to repeat reciprocating movement in the direction indicated by an arrow in synchronism with the intermittent transferring of the sheet 10 by a driving means fixed on the mainframe, for instance, a cam 36 and a cam follower 38. In the top part of the die, an auxiliary path 34 for the cooling medium is also provided.

The plug guide 40 which forms a pair with said metal solid female die 32 has an outer shape of hollow box as its entirety in order to contain a plug base 52 and to serve as a path for delivering the compressed-air. Bottom plate 49 of the guide is fixedly supported on the vertical mainframe by, for instance, a bracket 46.

Figure 3:
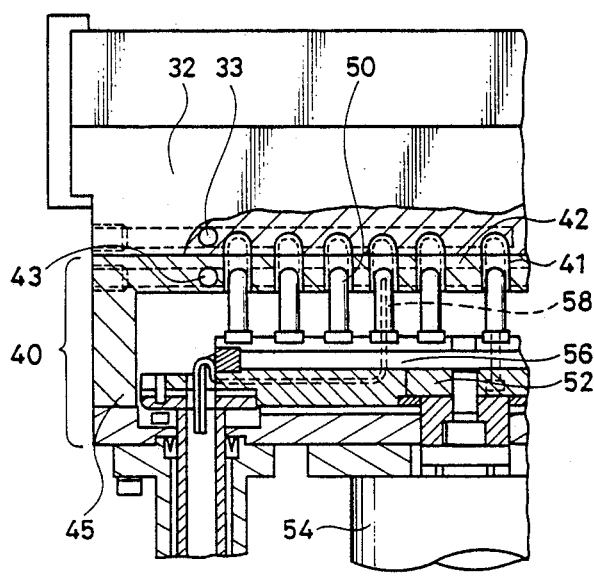
FIG. 3 is a front sectional elevation of an essential parts of the molding station.

As shown in a schematic sectional front view of the molding station of FIG. 3, the top plate 42 of said plug guide 40 is designed to be able to contact the metal solid female die 32 and has through holes 41 whose number and planar configuration are equal to the pockets 14 to be formed. The through hole 41 receive and permit unobstructed movement of the plugs 50.

Paths 43 for the cooling medium are also provided close to the through holes 41. An auxiliary path 44 for the cooling medium is arranged in side walls 45. Under the bottom plate 49, an oil cylinder 54 for actuating the plug base 52 and a compressed-air supply tube 48 are fixed.

The plug base 52 has an embedded heater 56 and the plugs 50 of the number equal to that of the pocket 14 to be formed in one tact in upwardly projected fashion. At least one of the plugs 50 has an embedded temperature sensor 58.

Figure 4A:
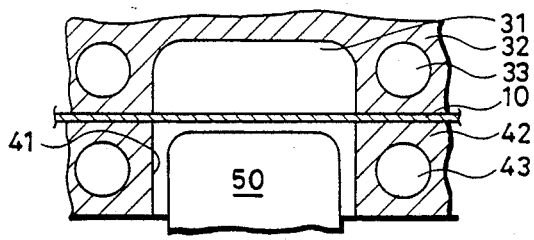
FIGS. 4A, 4B and 4C are enlarged schematic views of a part inset by dotted circle in FIG. 1.
Figure 4B:
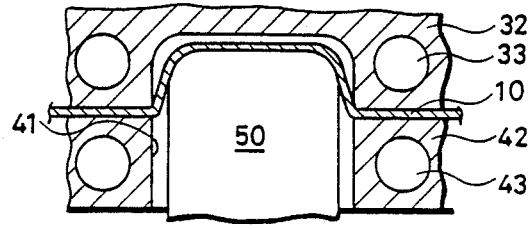
Figure 4C:
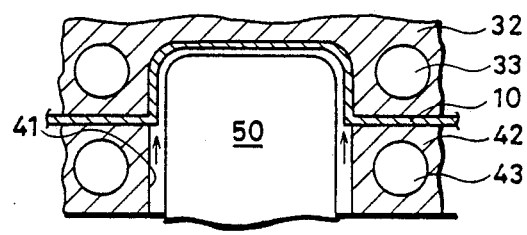

Enlarged schemes of FIG. 4 illustrate, in detail, the functions of the respective components in the molding station. Namely, after the sheet 10 has been sandwiched (a) between the metal solid female die 32 and the corresponding top plate 42 in synchronism with sheet's intermittent travel, the plug base 52 moves upward byy the actuating cylinder 54 and the plugs 50, being guided by the through holes 41, press the sheet 10 against the recesses 31 of the metal solid die 32. After the preliminary molding of the pockets 14 up to about 70% of the volumes of the recesses 31 has been made (b), compressed-air is blown into the expanded parts through a clearance formed between the plugs 50 and the through holes 41 as indicated by an arrow to complete the molding operation (c). Thereafter, a die separating operation is performed in synchronism with the intermittent transferring of the sheet 10.

ADVANTAGES

Figure 5:
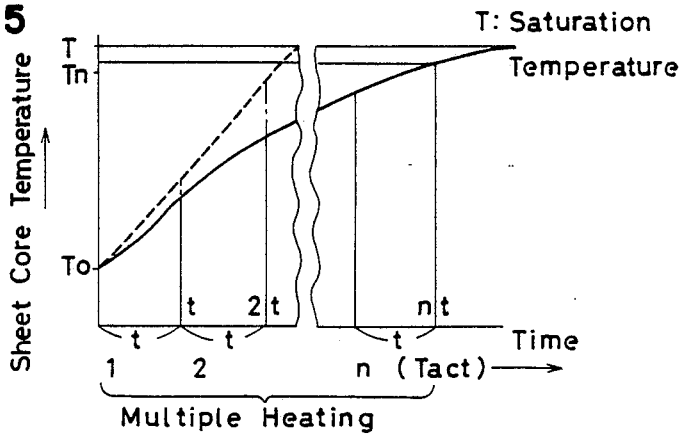
FIG. 5 is a graph for indicating the heating modes.

What is worthy of special mention amongst the matters explained above is first an adoption of a heating mode which is indicated as "multiple heating" in FIG. 5 to heat the pocket-forming regions of the multiple laminated sheet 10. Namely, the multiple heating is a mode of heating the core PE layer at its initial temperature $T_0$ rapidly to a temperature $T_n$, that is close to the saturation temperature T, being equal to the temperature of the heating plates, in a period which corresponds to the number of tact (nt) being proportional to the unit length in the intermittent transferring of the sheet 10.

The preparative heating station 20 of this example is designed to achieve a heating operation in a time which corresponds to 3 tacts, based on a presumption that the time required for the molding operation is set to correspond to 1 tact, in order to accord $T_n$ with T, or, at least, to approximate $T_n$ to T.

In other words, by allotting at least thrice length of the sheet at the molding station to the preparative station, a high speed molding such as 2.9 m/minute (100 rows of standard pocket/minute) has been made possible. In the molding step, an efficient cooling and/or a prevention of excessive rise in the temperature at the non-pocket regions of the multiple laminated sheet has been achieved by arranging paths for the cooling medium close to the recesses of the metal solid die and the through holes of the top plate of the plug guide to enable a stable transferring at high speed.

Meanwhile, any sheets having no core PE layer do not require such a consideration because of their broad moldable temperature range and a heating mode which is indifferent to the saturation temperature. This mode, which is indicated by a broken curve in the drawing, is sufficient for the molding of such conventional sheets.

The second point of special mention is an effective cooling of the non-pocket regions of the multiple laminated sheet or any contrivance for preventing the excessive rise in temperature of the regions. Since no such consideration is required for the molding die of the sheet which lacks any core PE layer, the paths for the cooling mediu may be arranged remote from the recesses and through holes for the convenience of the machining.

EXAMPLE 2

Preparative-Heating

The preparative heating station 20 which occupies the right half of FIG. 1 is a station arranged before the pocket-forming station of a PTP machine. In this Figure, the unrolled sheet 10 is shown to be intermittently transferred along a horizontal transferring path 12 formed between a pair of heating plates 22 and 24 each of which is shown to have a length corresponding to 3 tacts, extending from the right extreme and terminating before the molding station 30.

In this example, the inlet part of the transferring path 12 for the unrolled sheet 10, i.e., parts occupying about one third of the heating plates 22/24 from the right extreme of the drawing, corresponds to a region 60 for forced air-cooling. The main components of the forced air-cooling means are solid blocks 62/64 of good heat conductive material (usually, of a metal) closely fixed on the heating plates 22/24, one on top surface of the upper plate 22 and the other beneath bottom surface of the lower plate 24. Tubular paths 74 and 76 for communicating air arranged meanderingly inside them as shown by dotted line in FIGS. 1 and 6.

The inlet pipes 70/72 and outlet pipes 78/80 both communicating to the tubular paths 74/76 are also provided. The pipes are combined with an unshown air supplying means to serve themselves to communicate air in the directions indicated by arrows to make the forced air-cooling of those parts possible.

If no forced air-cooling means is provided, a remarkable imbalance in temperature distribution would result over the plates and only a control as coarse as ±3.0° would be attained at best. An adjustment on the electric power consumption distribution such as an arrangement of making the output of heater near the inlet of the transferring path much smaller than that near the supporting means (bracket) and an attempt of adopting heat pipes were not successful.

In contrast to this, the provision of the forced air-cooling means in accordance with the present invention however made the effective control of the regions' temperature within ±1.5° possible and this equalization was maintained without any subsequent adjustment once the pressure of the air supplied to both the blocks 62/64 was adequately set. This means a virtually complete thermal equilibrium was being maintained in the apparatus.

In the drawing, the solid blocks 62/64 are shown to be separate components from the heating plates 22/24 but the same effect can be obtained by embedding the tubular paths 74 and 76 inside the corresponding parts of the heating plates themselves and by making both components as one body.

Figure 7:
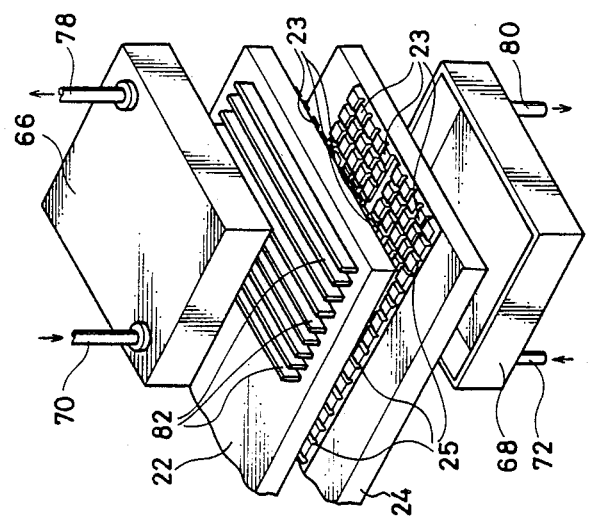
FIG. 7 is an exploded perspctive view showing an essential parts of further example of th heating plates.

FIG. 7 indicates another example of the forced air-cooling means wherein the previously mentioned solid blocks 62/64 are replaced by a combination of the fins 82 and the shrouds 66/68 covering the fins. Namely, on the top surface of the upper heating plate 22 and the bottom surface of the lower heating plate 24, are provided a multiplicity of fins 82 (those beneath the plate 24 are hidden in the drawing).

This multiplicity of the fins 82 and shrouds 66/68 each covering each group of the fins, and inlet pipes 70/72 and outlet pipes 78/80 for communicating compressed-air through both the shrouds 67/68 constitute the forced air-cooling means.

ADVANTAGES

Figure 6:
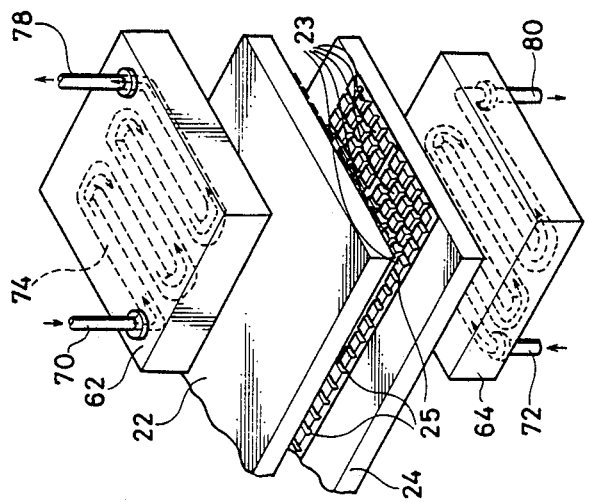
FIG. 6 is an exploded perspective view showing an essential parts of another example of the heating plates.

In the example previously elucidated by referring to FIG. 6, both heating plates 22 and 24 were made of aluminum in a dimension of 400 mm (length)×235 mm (width)×25 mm (thickness) and electric heaters of 3 Kw (upper plate) and 2 Kw (lower plate) were embedded therein. When the heating plates were supported by the brackets 26 and 28 of 130 mm width at left hand parts with margins of 85, respectively, the temperature difference observed between the left and right extremes was 7°-8° C.

Then the solid blocks 66 and 68 made of aluminum in a dimension of 135 mm (length)×235 mm (width)×15 mm (thickness) were fixed on the right one thirds of both plates. The tubular paths 74 and 76 of a diameter of 7.5 mm and a total length of 800 mm for communicating air were provided in both the solid blocks 66 and 68, and air of the ambient temperature was supplied to the paths at a rate of 17.5 L/minute. As a result, the temperature difference of the right extremes of the both heating plates with respect to the their left extremes decreased to about 1°-3° C.

What we claim is:

1. In an apparatus for making PTP pockets on a freshly unrolled sheet intermittently traveling over two adjacent stations of a plurality of stations installed along a transferring path for the sheet, the apparatus which comprises a combination of the following means being supported in cantilever fashion by a cantilever support means on a vertical mainframe of a PTP machine:
   (a) a pair of heating plates positioned on a first station, having a multiplicity of regularly arranged plateaux, which correspond to PTP pockets regions of said unrolled sheet and are divided by lattice grooves on their surfaces which contact said unrolled sheet and which confront each other, both plates being capable of sandwiching said sheet therebetween and of conductively heating said sheet to raise the core-temperature of said sheet to the temperature of said plates and at least one plate of which is capable of moving reciprocally in the direction perpendicular to the transferring path in synchrony with the intermittent travel of said sheet;
   (b) a forced air-cooling means provided on the outer surfaces of said pair of heating plates and at parts remote from said cantilever support means;
   (c) a temperature sensor provided on said heating plates, having a signal which is capable of controlling said forced air-cooling means;
   (d) a metal solid female die positioned on a second station, having a plurality of recesses corresponding to PTP pockets and paths for a cooling medium arranged closely to the recesses, and being capable of moving reciprocally in the direction perpendicular to the transferring path in synchrony with the intermittent travel of said sheet;
   (e) a plug-guide positioned on said second station, having a top plate which contains a plurality of holes each of which said holes accommodates plugs which corresponds to each of said recesses which allows for free plug movement, and having paths for a cooling medium arranged closely to said holes and being capable of sandwiching said fresh sheet between said solid female die and said top plate;
   (f) a number of plug-bases integrally holding said plugs which correspond to the hole numbers of said top plate, having a controllable heating means and being capable of moving reciprocally in the direction perpendicular to the transferring path in synchrony with the movement of said metal solid female die, each of said plugs capable of pressing said sandwiched sheet at each of the corresponding pocket regions to preliminarily expand said regions to about 70% of the volume of the recesses of said metal solid female die; and
   (g) a means for blowing compressed-air into said preliminarily expanded pocket regions of the PTP sheet through the clearance formed between said plugs and said plug-guide.

2. The apparatus as claimed in claim 1 wherein said forced air-cooling means comprises solid blocks of heat conducting material which are installed closely and integrally on said surfaces and having tubular paths for circulating air therethrough.

3. The apparatus as claimed in claim 1 wherein said forced air-cooling means is a combination of a multiplicity of cooling fins provided on said surfaces and of air-tightly sealed shrouds covering said fins with means for circulating air through the shrouds.

* * * * *